United States Patent
Rubin et al.

(10) Patent No.: US 6,567,428 B1
(45) Date of Patent: May 20, 2003

(54) METHOD AND SYSTEM FOR USING LOW DATA RATE VOCORDER PACKETS TO MULTIPLEX SIGNALING PACKETS INTO A CDMA TRAFFIC CHANNEL FOR HIGH QUALITY CDMA VOICE TRANSMISSION

(75) Inventors: Dimitri Rubin, Cupertino, CA (US); Douglas J. McPherson, San Diego, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/405,605

(22) Filed: Sep. 24, 1999

(51) Int. Cl.$^7$ .................................................. H04J 3/02
(52) U.S. Cl. ...................... 370/538; 370/335; 370/342; 370/468; 370/493; 370/528
(58) Field of Search ................................. 370/468, 470, 370/473, 474, 476, 522, 528, 342, 441, 335, 465, 538

(56) References Cited

U.S. PATENT DOCUMENTS

| | | | | |
|---|---|---|---|---|
| 5,511,073 A | * | 4/1996 | Padovani et al. | 370/82 |
| 5,515,375 A | * | 5/1996 | DeClerck | 370/84 |
| 6,141,353 A | * | 10/2000 | Li | 370/465 |
| 6,421,353 B1 | * | 7/2002 | Kim | 370/465 |

FOREIGN PATENT DOCUMENTS

| | | | | |
|---|---|---|---|---|
| JP | | 357157674 A | * 9/1982 | H04M/11/06 |

OTHER PUBLICATIONS

Cellaria L. et al: "A VR–CELP Codec Implementation for CDMA Mobile Communications," Proceedings of the International Conference on Acoustics, Speech, and Signal Processing. (ICASSP), US, New York, IEEE, Apr. 19, 1994, pp. I–281–I–284, XP000529398 ISBN: 0–7803–1775–9 Paragraphs '0001!, '0002!; Figure 1.

* cited by examiner

Primary Examiner—Nay Maung
Assistant Examiner—Tanmay Lele
(74) Attorney, Agent, or Firm—Peter Zawilski

(57) ABSTRACT

In a CDMA based wireless digital communications system, a CDMA communications station. The CDMA communications station includes a signal encoder adapted to encode signaling information into a series of signaling packets, wherein the signal encoder process the signal information into variable size signaling packets in accordance with an amount of the signaling information. A voice encoder is included in the station and is adapted to encode voice information and process the voice information into a series of voice packets, wherein the voice encoder processes the voice information into variable size voice packets in accordance with an amount of the voice information. A multiplexer is included in the station wherein the multiplexer is coupled to receive the voice packets and coupled to receive the signaling packets and for combining the voice packets and the signaling packets into a traffic frame. A transmitter is coupled to the multiplexer for transmitting the traffic frame as received from the multiplexer. The multiplexer is further adapted to include the signaling packets into the traffic frame with the voice packets such that more signaling information is included in traffic frames having smaller voice packets with respect to signaling information included in traffic frames having larger voice packets such that the size of the voice packets are not constrained by the transmission of signaling packets.

19 Claims, 7 Drawing Sheets

METHOD AND SYSTEM FOR USING LOW DATA RATE VOCORDER PACKETS TO MULTIPLEX SIGNALING PACKETS INTO A CDMA TRAFFIC CHANNEL FOR HIGH QUALITY CDMA VOICE TRANSMISSION

TECHNICAL FIELD

The present invention relates generally to digital information systems. More particularly, the present invention relates to code division multiple access (CDMA) based transmission and reception systems for low latency, high-quality, voice applications.

BACKGROUND ART

The transmission of digital information and data between systems has become an essential part of commonly used systems. With such systems, information content is transmitted and received in digital form as opposed to analog form. The transmission of voice information across long distances has long been associated with well known analog transmission techniques. These techniques include, for example, the traditional plain old telephone system (POTS) network, conventional wireless VHF/UHF two-way communications systems, and the like. The modern digital form of communication and signal processing techniques offer numerous advantages and are rapidly replacing the traditional means. In most applications, the user has no perception of the digital nature of the information being received. CDMA based digital cellular systems are among the most rapidly growing of the modern forms of digital communications.

Prior art FIG. 1 shows a CDMA digital cellular system 100. System 100 typically includes many hundreds of mobile cellular telephones (e.g., "cell phones") communicatively coupled to a base station in a geographic area. FIG. 1 depicts a single such base station 104 and a single cell phone 102. The transmission system uses an RF communications channel 106 to link the base station 104 with the cell phone 102.

In typical applications, many hundreds of cell phones share the communications link 106 to the geographical area's base station 104. Digital signal processing techniques allow the efficient use of the limited communications channel bandwidth by the multiple cell phones. CDMA is, in part, a signal processing technique which provides for the efficient multiplexing of voice and other data into discrete time and frequency based packets of information for transmission between each of a plurality of cell phones (e.g., cell phone 102) and the shared base station 104.

Although the CDMA algorithms are very efficient, the bandwidth of the communications channel 106 is finite. As with other digital communications systems, there are times when two-way communications using system 100 will suffer some amount of signal degradation during the transmission from the originating device to the receiving device.

This degradation can have many causes. For example, bad weather conditions may reduce the effective bandwidth available for communications channel 106. As another example, system 100 may at times require the transmission of large amounts of signaling and call maintenance data in addition to the voice traffic. In both these cases, the available bandwidth for transmitting voice information may at times fall below some optimal level. This degradation often results in the loss of some voice information, some distortion in the voice signal, or some noticeable noise in the received signal (e.g., as in the case of a wireless telephone). Generally, the more significant the loss of information at the receiving device, the more objectionable performance of the communications system.

Hence, the basic cause of the degradation is the fact that, at certain times, there exists more voice information than available bandwidth for transmission of the voice information, causing system 100 to reduce (e.g., throw away) some amount of voice information to fit within the available bandwidth, and the fact that at certain times, the time required to implement the various signal processing algorithms induce an objectionable degree of latency into the bi-directional communication (e.g., conversation).

In an effort to help correct this problem, the CDMA communications industry has adopted various signal encoding/decoding techniques which counteract the effects of signal degradation and improve or ensure the integrity of the information at the receiving device, and signal processing techniques which are fast executing to reduce latency. Hence, many digital communications systems available on the market use encoding/decoding methods that are each able to accomplish reasonable communication quality under normal operating conditions. However, while these encoding/decoding methods help ensure the integrity of the received information, they also tend to add a larger than desired amount of latency to communications system as the encoding/decoding algorithms are processed. Examples include standards such as IS-95A, J-STD-008, TLA/FIA-95-B, etc., which describe the multiplexing an demultiplexing primary, secondary and signaling traffic to and from an underlying physical layer traffic channel in a CDMA system.

Thus, what is needed is a solution which tailors the encoding/decoding techniques to maximize voice quality of the CDMA communications system. What is required is a method which seamlessly functions with the dynamically adjusting parameters of the encoding/decoding algorithms utilized in CDMA communications systems. What is required is a solution capable of transmitting the required side band data without adding significant latency to the voice communications data. In addition, the required solution should not overly reduce the observed voice signal quality. The present invention provides a novel solution to the above requirements.

DISCLOSURE OF THE INVENTION

The present invention provides a solution which tailors the encoding/decoding techniques to maximize voice quality of the CDMA communications system. The present invention provides a method and system which seamlessly functions with the dynamically adjusting parameters of the encoding/decoding algorithms utilized in CDMA communications systems. The present invention provides a solution capable of transmitting the required signaling data without adding significant latency to the voice communications data and without overly reducing the observed voice signal quality.

In one embodiment, the present invention is implemented as a CDMA communications station in a CDMA based wireless digital communications system. The CDMA communications station includes a signal encoder adapted to encode signaling information into a series of signaling packets, wherein the signal encoder process the signal information into variable size signaling packets in accordance with an amount of the signaling information. A voice encoder is included in the station and is adapted to encode voice information and process the voice information into a series of voice packets, wherein the voice encoder processes the voice information into variable size voice packets in accordance with an amount of the voice information. A multiplexer is included in the station wherein the multiplexer is coupled to receive the voice packets and coupled to receive the signaling packets and for combining the voice packets and the signaling packets into a traffic frame. A transmitter is coupled to the multiplexer for transmitting the traffic frame as received from the multiplexer.

To avoid constraining the traffic channel bandwidth available for transmitting voice information, the multiplexer maximizes voice quality by implementing the multiplex sublayer functionality in such a way as to opportunistically wait for the voice encoder to transmit a "less-than-full-rate" voice packets to include signaling packets rather than force the voice encoder to a lower data rate when multiplexer has signaling data to send. The multiplexer includes the signaling packets into the traffic frame with the voice packets such that more signaling information is included in traffic frames having smaller voice packets with respect to signaling information included in traffic frames having larger voice packets such that the size of the voice packets are not constrained by the transmission of signaling packets. In so doing, the data rate of the voice encoder is not artificially constrained by the signaling requirements of the communication station.

BRIEF DESCRIPTION OF THE DRAWINGS

The accompanying drawings, which are incorporated in and form a part of this specification, illustrate embodiments of the invention and, together with the description, serve to explain the principles of the invention.

Prior art

BEST MODE FOR CARRYING OUT THE INVENTION

Reference will now be made in detail to the preferred embodiments of the invention, a method and system for using low data rate vocoder packets to multiplex signaling packets into a CDMA traffic channel for high quality CDMA voice transmission, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not unnecessarily to obscure aspects of the present invention.

The present invention provides a solution which tailors the encoding/decoding techniques to maximize voice quality of the CDMA communications system. The present invention provides a method and system which seamlessly functions with the dynamically adjusting parameters of the encoding/decoding algorithms utilized in CDMA communications systems. The present invention provides a solution capable of transmitting the required side band data without adding significant latency to the voice communications data and without overly reducing the observed voice signal quality.

Specifically, embodiments of the present invention include multiplexing functionality that avoids constraining the traffic channel bandwidth available for transmitting voice information by implementing the multiplex sublayer functionality in such a way as to opportunistically wait for the voice encoder to transmit a "less-than-full-rate" voice packets to include signaling packets rather than force the voice encoder to a lower data rate when multiplexer has signaling data to send. The multiplex sublayer functionality includes the signaling packets into the traffic frame with the voice packets such that more signaling information is included in traffic frames having smaller voice packets with respect to signaling information included in traffic frames having larger voice packets such that the size of the voice packets are not constrained by the transmission of signaling packets. In so doing, the data rate of the voice encoder is not artificially constrained by the signaling requirements of the communication station. Embodiments the present invention are described in greater detail below.

Figure 1:
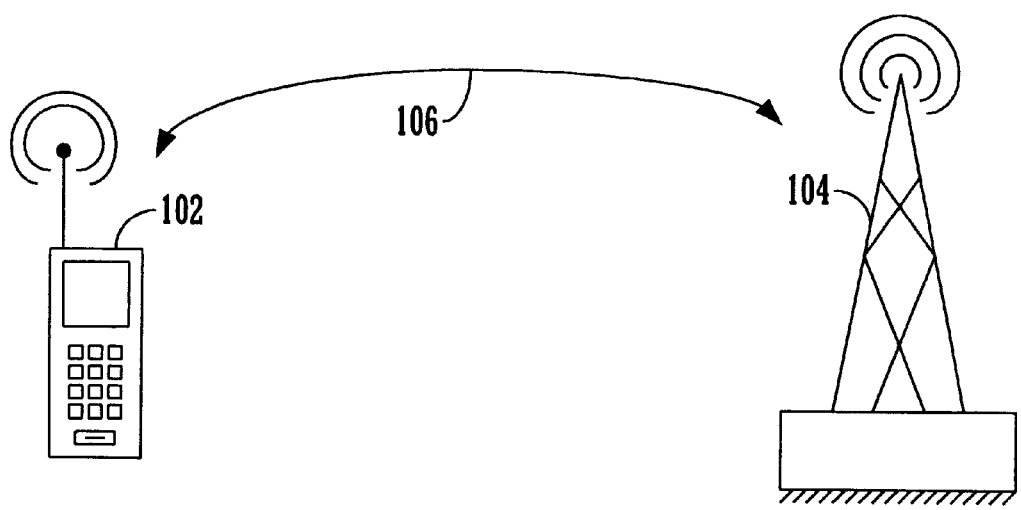
FIG. 1 shows a general diagram of a typical CDMA digital cellular system.
Figure 2:
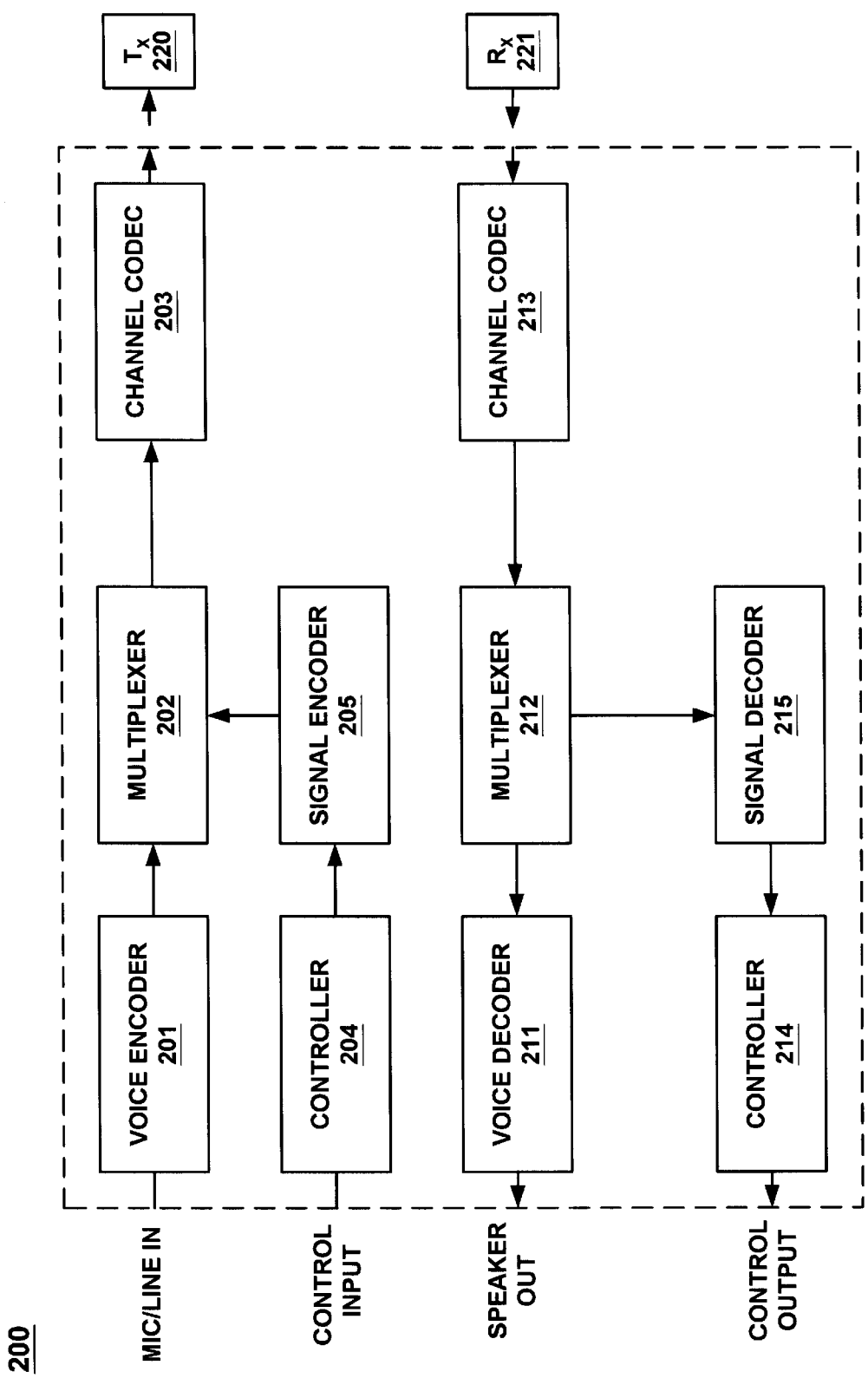
FIG. 2 shows a diagram of a CDMA digital cellular mobile station in accordance with one embodiment of the present invention.

Referring now to FIG. 2, a diagram of a mobile station 200 in accordance with one embodiment of the present invention is shown. Station 200 is typically implemented as a cell phone. Station 200 is bi-directional, in that information is both transmitted (e.g., to a base station) via an included transmitter 220 and received via an included receiver 221. As depicted in FIG. 2, on the transmitter side, station 200 includes a voice encoder 201 coupled to a multiplexer 202. A controller 204 is also coupled to multiplexer 202 via a signal encoder 205. The output of multiplexer 202 is coupled to a channel codec 203, which is in turn coupled to the transmitter 220. On the receiver side, station 200 includes the receiver 221 coupled to a channel codec 213. The output of channel codec 213 is coupled to a multiplexer 212. A multiplexer 212 is coupled to a voice decoder 211, and is also coupled to a controller 214 via a signal decoder 215.

In the present embodiment, station 200 implements a mobile CDMA communications station in a CDMA based wireless digital communications system. The signal encoder 205 in station 200 is a CDMA based signal encoder adapted to encode signaling information from controller 204 into a series of signaling packets. Voice encoder 201 functions in part by encoding voice information at a variable data rate and processing the voice information into a series of voice packets. Multiplexer 202 is coupled to receive the voice packets from the voice encoder 201 and coupled to receive the signaling packets from the signal encoder 205. Multiplexer 202 combines the voice packets and the signaling packets into a series of "traffic frames" for transmission via channel codec 203 and transmitter 220. Channel codec 203 encodes the traffic frames into CDMA based transmission frames and couples the transmission frames to transmitter 220 for transmission.

In the present embodiment, the operation of multiplexer 202 is in accordance with well known CDMA protocols (e.g., the multiplex sublayer in IS-95A, J-STD-008, TLA/ EIA-95-B, etc.). Multiplexer 202 functions in part by multiplexing primary, secondary, and signaling traffic to channel codec 203 and transmitter 220 (e.g., the underlying physical layer traffic channel).

In the present embodiment, the traffic channel (e.g., the communications pathway for multiplexer 202 to transmitter 220) itself can be configured to use up to 4 distinct frame rates. In accordance with CDMA protocols, the traffic channel comprises a series of consecutive 20 ms frames. As determined by the configuration of multiplexer 202 (e.g., the multiplex sublayer in IS-95A, J-STD-008, TIA/EIA-95-B, etc.) up to 4 distinct frame rates are implemented using one of 4 possible frame sizes. Different traffic frame sizes can be implemented in each 20 ms traffic frame, wherein each frame size is associated with a particular voice encoder 201 data rate. Consecutive 20 ms traffic frames need not transmit the same size of frame (e.g., amount of data), but rather the size of the traffic frame can be varied dynamically from frame to frame. The primary reason for this architecture is to support a variable bit rate output of voice encoder 201. During normal operation, voice encoder 201 outputs variable size voice packets corresponding to the amount of voice information in the incoming voice signal (e.g., mic/line-in). Low data rate voice packets (e.g., smaller voice packets) are produced when less information is present in voice signal, and high data rate voice packets (e.g., larger) are produced when more information is present.

Figure 3:
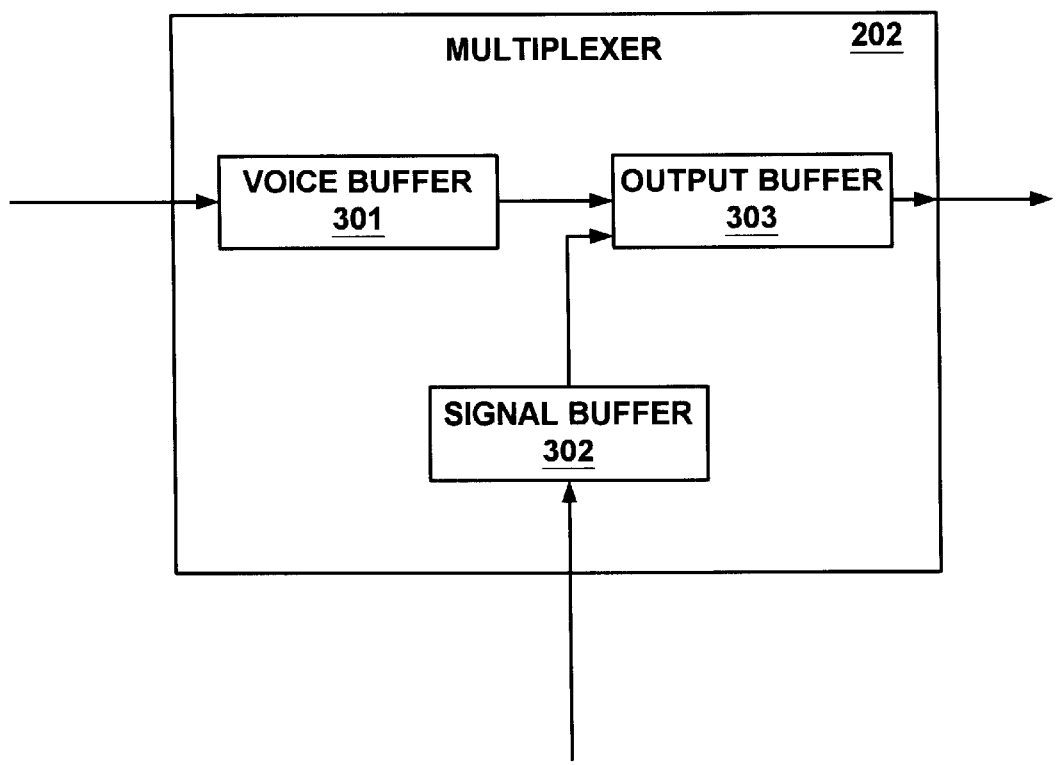
FIG. 3 shows a diagram depicting a multiplexer of a CDMA digital cellular mobile station in accordance with one embodiment of the present invention.

Referring now to FIG. 3, a diagram depicting multiplexer 202 in greater detail is shown. As depicted in FIG. 3, in the present embodiment, multiplexer 202 includes a voice buffer 301 and a signal buffer 302 both coupled to an output buffer 303. The buffers 301–303 function by allowing multiplexer 202 to receive incoming voice packets from voice encoder 201 and receive incoming signaling packets from signal encoder 205 and to construct outgoing traffic frames therefrom. As described above, in the present embodiment, multiplexer 202 uses the 4 distinct frame rates to transport both the voice data from voice encoder 201 and signal data from signal encoder 205. Multiplexer 202 makes a dynamic frame by frame determination as to which of the four frame rates will be used (e.g., what size traffic frame will be built) and how much of each of the logical data type (e.g. voice data, signal data, etc.) will be contained therein. Based upon this determination, voice data from voice buffer 301 and signal data from signal buffer 302 are combined into traffic frames within output buffer 303, and are in turn output to channel codec 203 and transmitter 220 (as shown in FIG. 2).

It should be noted that two aspects of the implementation of multiplexer 202 and of the interface between multiplexer 202 and voice encoder 201 have a disproportionate effect on the observed voice quality. The first aspect is the overall latency of station 200, referring to the delay voice packets experience in reaching a far end communication device (not shown). The second aspect is the degree to which voice packets produced by voice encoder 201 are limited in size because of station 200's need to transmit call control or call maintenance data (e.g., signaling packets) over the same traffic channel as is used for the voice packets.

The overall latency, or end-to-end delay, experienced by voice packets can have a significant impact on the perceived "natural" quality of the conversation. In the present embodiment, while the CDMA communications system including station 200 of the present invention has several inherent delays associated with the signal processing for voice and channel encoding and decoding, station 200 includes novel features for greatly reducing the latency experienced by the voice packets.

Figure 4:
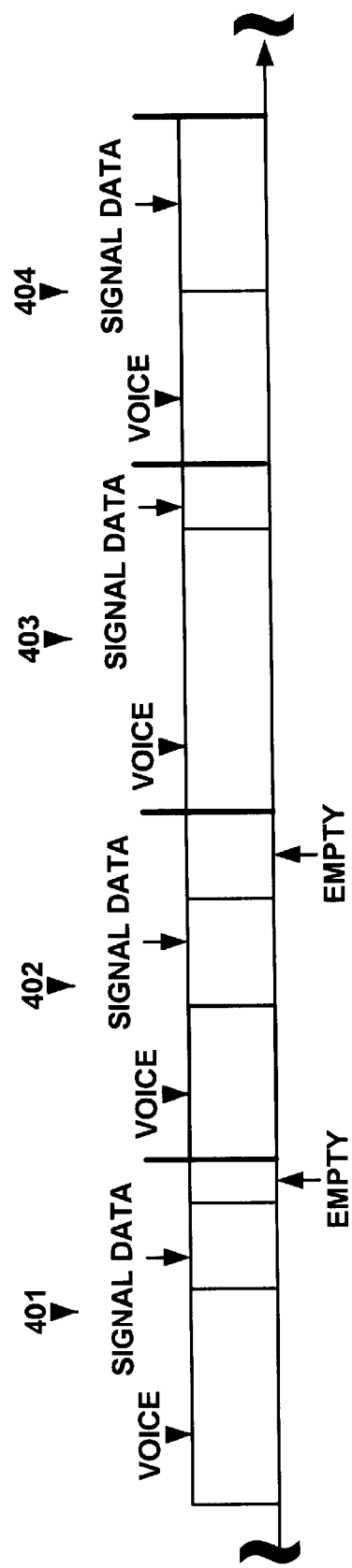
FIG. 4 shows a diagram depicting 4 consecutive traffic frames as output from the multiplexer of FIG. 3 in accordance with one embodiment of the present invention.

Referring now to FIG. 4, a diagram 400 showing for consecutive the traffic frames 401–404 as output from multiplexer 202 is shown. As depicted in FIG. 4, each of traffic frames 401–404 include voice data and signal data, with traffic frames 401–402 also including amounts of empty space. As depicted in FIG. 4, transmission time is represented along horizontal axis, and each of frames 401–404 are 20 ms wide.

In the present embodiment, voice encoder 201 makes a decision every 20 ms as to the size of voice packet which it will build for transmission via the traffic channel to the far end. This decision is based heavily on the information content of the voice signal (e.g., received from mic/line-in). Higher voice information content in the voice signal requires larger size voice packets to be built by voice encoder 201. Lower voice information content allows voice encoder 201 to build smaller voice packets, which results in power and capacity savings.

For a given traffic frame, if voice encoder 201 is restricted by multiplexer 202 from building higher-rate voice packets so that multiplexer 202 can multiplex greater amounts of signaling packets into the traffic frame, and if voice encoder 201 would otherwise have made the decision to generate and send a high rate voice packet due to high voice information content of voice signal, then the observed voice quality will be necessarily reduced. This is graphically depicted in diagram 400 by traffic frames 401 and 402 which are not space constrained (e.g., where they both include empty space), as opposed to traffic frames 403 and 404.

In accordance with the present invention, multiplexer 202 is coupled to receive an early voice data rate indication from the voice encoder such that the multiplexer 202 is able to preconfigure the traffic frame for the variable data rate voice packet to be delivered once the processing of the voice encoder is complete. This allows the traffic frame to be sent by multiplexer 202 to the channel codec 203 and transmitter 220 for transmission immediately upon reception of the voice packet from the voice encoder, thereby reducing the overall latency and improving the observed voice quality of the communications system.

Figure 5:
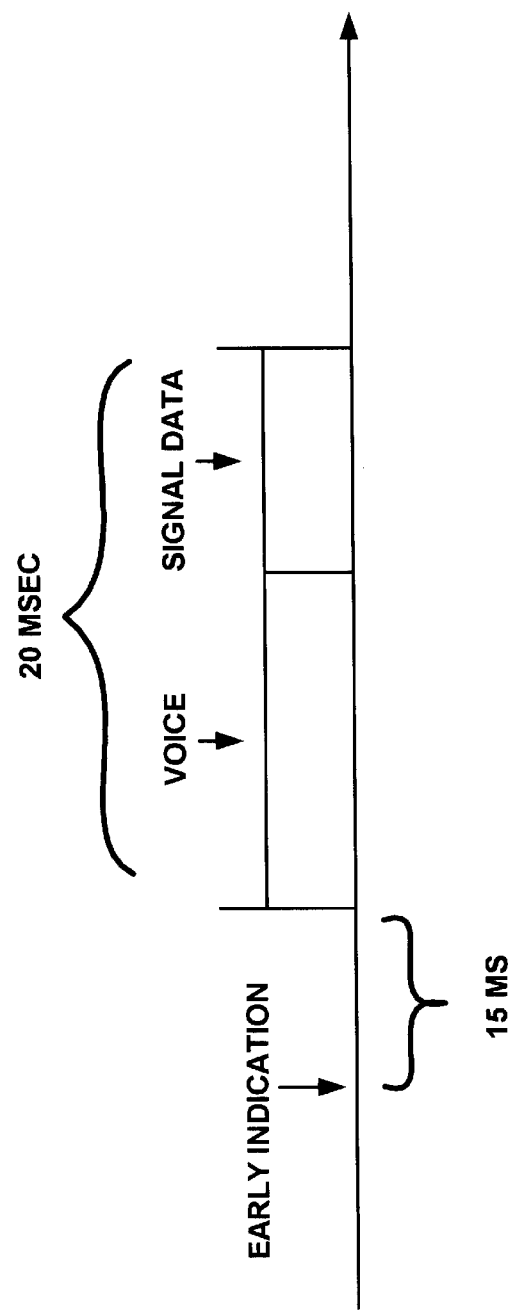
FIG. 5 shows a diagram of an exemplary 20 ms traffic frame with respect to time in accordance with one embodiment of the present invention.

Referring now to FIG. 5, a diagram of an exemplary 20 ms traffic frame 500 with respect to time (e.g., shown along the horizontal axis) in accordance with one embodiment the present invention is shown.

A first embodiment of the present invention increases observed voice quality by minimizing the latency in transmission of voice packets by taking advantage of an aspect of the variable data rate ability of voice encoder 201 wherein voice encoder 201 provides an early indication to multiplexer 202 as to the size of voice packet which it is generating. As described above, voice encoder 201 builds the variable size voice packet for inclusion in each 20 ms traffic frame, in this case, traffic frame 500.

In this embodiment, voice encoder 201 functions by first performing a vocoder rate, or data rate, determination phase which determines the size of voice packet to be built, followed by an analysis/synthesis phase during which the voice packet is actually constructed. In accordance with present invention, voice encoder 201 informs multiplexer 202 of the voice packet size as soon as the vocoder rate determination phase is complete. This early indication allows the multiplex sublayer (e.g., multiplexer 202) sufficient time to fully prepare traffic frame 500 for transmission within its current 20 ms time duration. By taking into consideration the size of the voice packet which will be delivered once analysis/synthesis is complete and the amount of signaling data which can be included, the multiplex sublayer functionality prepares all other portions of the traffic frame (e.g., signal data, etc.) while voice encoder 201 is completing the voice packet construction. Once the voice packet construction is complete, the voice packet is delivered to multiplexer 202 and inserted into a "reserved portion" of the traffic frame (e.g., traffic frame 500). Traffic frame 500 is then complete and is delivered to channel codec 203 for coding and transmission via transmitter 220. All of this takes place within the same 20 ms voice encoder time duration corresponding to the 20 ms time duration of traffic frame 500. In this manner, additional delays due to the operation of the multiplex sublayer functionality are not incurred. In accordance with the present embodiment, the voice packet is delivered to the channel codec 203 essentially as soon as it has been built by voice encoder 201.

Figure 6:
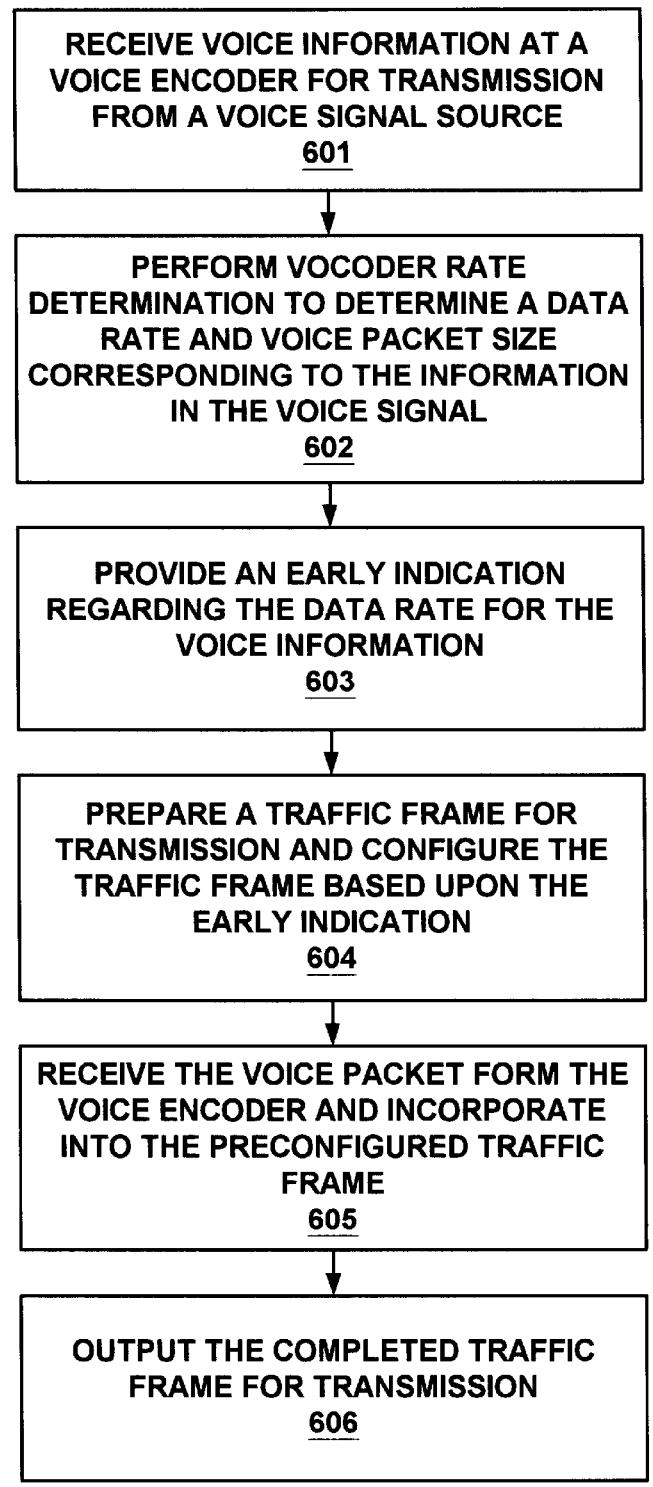
FIG. 6 shows a flow chart of the steps of a process in accordance with a first embodiment of the present invention.

FIG. 6 shows a flow chart of the steps of a process 600 in accordance with one embodiment of the present invention. As depicted in FIG. 6, process 600 shows the operating steps of the voice rate determination, encoding, and transmission process of a station (e.g., station 200) in accordance with the present invention.

Process 600 begins in step 601, where a voice encoder (e.g., voice encoder 201 of FIG. 2) in accordance with one embodiment of the present invention receives voice information from a voice signal source for transmission to a far-end device.

In step 602, voice encoder 201 performs vocoder rate determination on the voice signal to determine a data rate and a voice packet size corresponding to the information content of the voice signal. As described above, the information content of the voice signal varies with time. At some instances, more data is required to properly represent the voice information content than at other instances. Accordingly, the size of the voice packets built by the voice encoder 201 vary correspondingly.

In step 603, voice encoder 201 provides an early indication to multiplexer 202 regarding the data rate for the voice information in the voice signal. As described above, this early indication allows the multiplex sublayer (e.g., multiplexer 202) sufficient time to fully configure and prepare a traffic frame for transmission within the traffic frame's current 20 ms time duration.

In step 604, multiplexer 202 prepares a traffic frame for transmission. As described above, this traffic frame is configured based upon the early indication of the data rate received from the voice encoder 201.

In step 605, the voice packet from the voice encoder 201 is received by multiplexer 202 and is incorporated into the preconfigured traffic frame.

Hence, in step 606, the complete traffic frame is output by multiplexer 202 to a coupled channel codec 203 and transmitter 220 for transmission via the traffic channel. As described above, steps 602–606 take place within the same 20 ms voice encoder time duration corresponding to the 20 ms time duration of the traffic frame such that additional delays due to the operation of the multiplex sublayer functionality are not incurred.

With reference once again to FIG. 5, a second embodiment of the present invention increases observed voice quality by minimizing those occasions where the size of the voice packets produced by encoder 201 are constrained by the multiplex sublayer functionality, due to, for example, the need to transmit large amounts of signal data. This second embodiment maximizes voice quality by implementing the multiplex sublayer functionality in such a way as to opportunistically wait for voice encoder 201 to transmit a "less-than-full-rate" voice packet (e.g., a smaller voice packet) rather than force the voice encoder 201 to a lower data rate when multiplexer 202 has signaling data to send. In this embodiment, multiplexer 202 attempts to take advantage of the naturally occurring lower-rate voice packets to deliver signaling packets, and thereby minimize the negative effect which signaling traffic might otherwise have on voice quality (e.g., those occasions where large amounts of signal traffic necessitate discarding excessive amounts of voice information). The signaling packets are buffered (e.g., in signal buffer 302 shown in FIG. 3) until appropriate transmission opportunities arise. In so doing, the data rate of the voice encoder 201 is not artificially constrained by the signaling requirements of station 200.

It should be appreciated, however, that there may exist circumstances wherein multiplexer 202 must resort to constraining the bit rate of voice encoder 201 if the opportunity to send signaling information does not naturally occur within some period of time. In such situations, multiplexer 202 constrains the size of the voice packets generated by voice encoder 201 in order to allow the transmission of the signaling data. In such situations, the constraining of the bit rate of voice encoder 201 by multiplexer 202 is used as a fallback mechanism to ensure needed signal data is not starved of traffic channel bandwidth.

Figure 7:
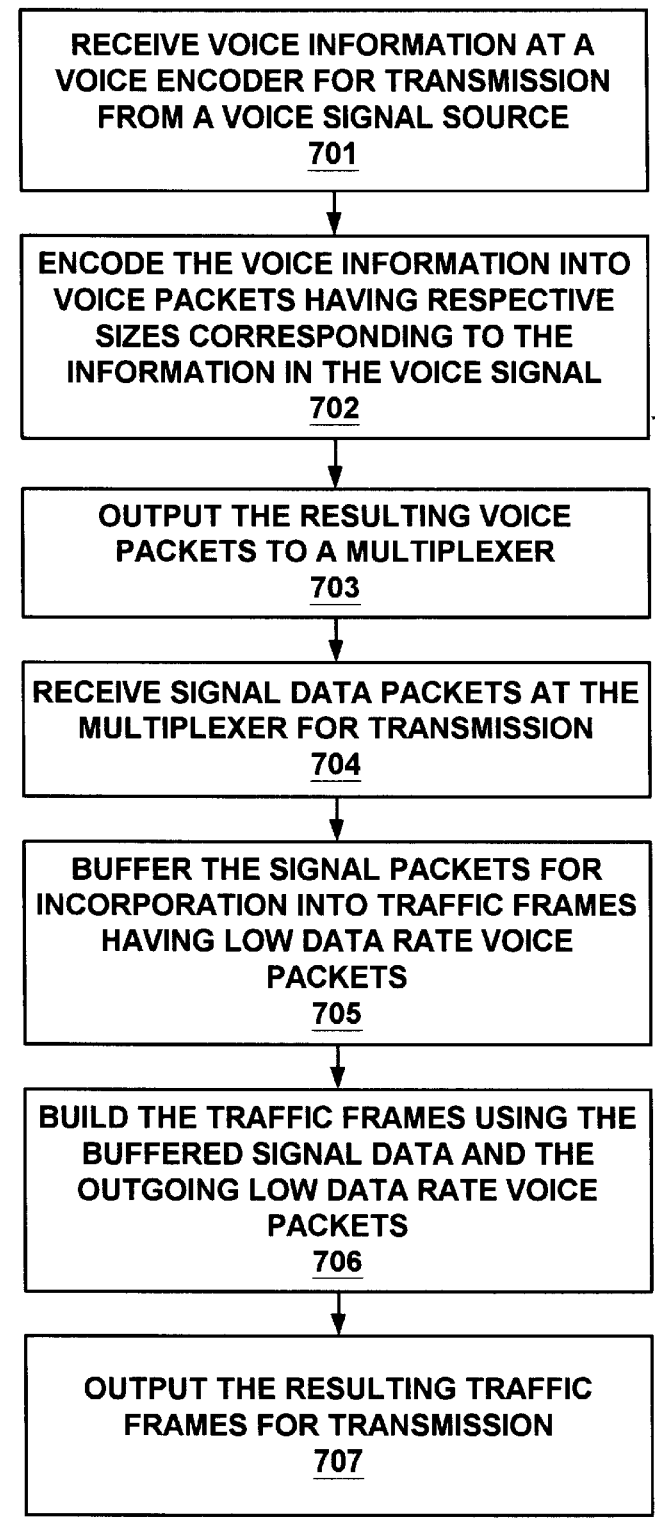
FIG. 7 shows a flow chart of the steps of a process in accordance with a second embodiment of a present invention.

FIG. 7 shows a flow chart of the steps of a process 700 in accordance with the second embodiment of a present invention. As depicted in FIG. 7, process 700 shows the steps of the operating process of a station 200 in accordance with the second embodiment of present invention described above, wherein the occasions where the size of the voice packets produced by voice encoder 201 are constrained by the multiplex sublayer functionality are minimized.

Process 700 begins in step 701, where a voice encoder (e.g., voice encoder 201 of FIG. 2) in accordance with one embodiment of the present invention receives voice information from a voice signal source for transmission to a far-end device.

In step 702, the voice information of the voice signal is encoded into voice packets having respective sizes (e.g., data rates) corresponding to the voice information contained in the voice signal.

In step 703, the resulting voice packets are output to the coupled to multiplexer 202.

In step 704, multiplexer 202 receives signal data packets for transmission via the traffic channel.

In step 705, multiplexer 202 buffers the signaling packets for incorporation into traffic frames having low data rate voice packets. As described above, multiplexer 202 includes a buffer (e.g., signal buffer 302 shown in FIG. 3) for temporarily storing signaling packets for later incorporation into a traffic frame. As described above, multiplexer 202 opportunistically waits for voice encoder 201 to transmit a "less-than-full-rate" voice packet (e.g., a smaller voice packet) in order to incorporate signal data packets into the traffic frames rather than force the voice encoder 201 to a lower data rate when multiplexer 202 has signaling data to send.

In step 706, the traffic frames are built by multiplexer 202 using the buffered signal data and the outgoing low data rate voice packets.

Subsequently, in step 707, multiplexer 202 outputs the resulting traffic frames to channel codec 203 and transmitter 220 for transmission. In this manner, process 700 takes advantage of the naturally occurring lower data rate voice packets to deliver signaling packets, and thereby minimize the negative effect which signaling traffic might otherwise have on voice quality.

Thus, the present invention provides a solution which tailors the encoding/decoding techniques to maximize voice quality of the CDMA communications system. The present invention provides a method and system which seamlessly functions with the dynamically adjusting parameters of the encoding/decoding algorithms utilized in CDMA communications systems. The present invention provides a solution capable of transmitting the required side band data without adding significant latency to the voice communications data and without overly reducing the observed voice signal quality.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. In a CDMA based wireless digital communications system, a CDMA communications station comprising:
    a signal encoder adapted to encode signaling information into a series of signaling packets, wherein the signal encoder processes the signal information into variable size signaling packets in accordance with an amount of the signaling information;
    a voice encoder adapted to encode voice information and process the voice information into a series of voice packets, wherein the voice encoder processes the voice information into variable size voice packets in accordance with an amount of the voice information;
    a multiplexer coupled to receive the voice packets and coupled to receive and buffer the signaling packets and for combining the voice packets and the signaling packets into a traffic frame; and
    a transmitter coupled to the multiplexer for transmitting the traffic frame as received from the multiplexer;
    wherein the multiplexer is adapted to determine, based at least in part on an early indication signal, that a less than full rate voice data packet is to be included in an outgoing traffic frame, and is further adapted to include an amount of buffered signal packet in the outgoing traffic frame so as to fill at least a portion of the traffic frame that is unused by the voice data packet; and wherein the early indication signal is provided to the multiplexer by the voice encoder.

2. The CDMA communications station of claim 1 wherein the voice encoder is adapted to process the voice information into the voice packet using a variable data rate, and wherein the variable data rate results in a variable size of the voice packet.

3. The CDMA communications station of claim 2 wherein the variable size of the voice packet is described by the early indication, enabling the multiplexer to preconfigure the traffic frame to include larger sized signaling packets.

4. The CDMA communications station of claim 1 wherein the signaling information includes control data for controlling communications with the CDMA communications station.

5. The CDMA communications station of claim 1 further including a channel codec coupled between the multiplexer and the transmitter for encoding the traffic frame onto a traffic channel in accordance with CDMA protocols.

6. The CDMA communications station of claim 1, wherein the multiplexer is configured to build traffic frames 20 ms in length by combining the voice packets and the signalling packets.

7. The CDMA communications station of claim 6 wherein the early indication allows the multiplexer to build the signaling information into the traffic frame while reserving a proper amount of space in the traffic frame for the voice packets as described by the early indication.

8. A mobile CDMA (code division multiple access) communications station in a CDMA wireless digital communications system, comprising:
    a signal encoder adapted to encode signaling information into a series of signaling packets, wherein the signal encoder processes the signal information into variable size signaling packets in accordance with an amount of the signaling information, and wherein the signaling information includes control data for controlling communications with the CDMA communications station;
    a voice encoder adapted to encode voice information and process the voice information into a series of voice packets, wherein the voice encoder processes the voice information into variable size voice packets in accordance with an amount of the voice information;
    a multiplexer coupled to receive the voice packets and coupled to receive the signaling packets and for combining the voice packets and the signaling packets into a traffic frame; and
    a transmitter coupled to the multiplexer for transmitting the traffic frame as received from the multiplexer;
    wherein the multiplexer is adapted to determine, based at least in part on an early indication signal, that a less than full rate voice data packet is to be included in an outgoing traffic frame, and is further adapted to include an amount of buffered signal packet in the outgoing traffic frame so as to fill at least a portion of the traffic frame that is unused by the voice data packet; and wherein the early indication signal is provided to the multiplexer by the voice encoder.

9. The CDMA communications station of claim 8 wherein the variable size of the voice packet is described by the early indication, enabling the multiplexer to preconfigure the traffic frame for the variable size of the voice packets.

10. The CDMA communications station of claim 8 wherein the signaling packets are combined with the voice packets in the traffic frame such that the size of the voice packets are not constrained by the transmission of the signaling packets.

11. The CDMA communications station of claim 8 further including a channel codec coupled between the multiplexer and the transmitter for encoding the traffic frame onto a traffic channel in accordance with CDMA protocols.

12. The CDMA communications station of claim 8, wherein the multiplexer is configured to build traffic frames 20 ms in length by combining the voice packets and the signalling packets.

13. The CDMA communications station of claim 12 wherein the early indication allows the multiplexer to build the signaling information into the traffic frame while reserving a proper amount of space in the traffic frame for the voice packets described by the early indication.

14. In a CDMA (code division multiple access) communications station, a method for high quality voice encoding and transmission, the method comprising the steps of:
   a) receiving voice information at a voice encoder for transmission from a voice signal;
   b) encoding the voice information into variable size packets of voice data having respective sizes corresponding to an amount of voice information included in the voice signal, and generating an early indication signal;
   c) outputting the voice packets and early indication signal to a coupled multiplexer;
   d) receiving, from a signal encoder, and buffering, within the multiplexer, packets of signal data;
   e) determining, based at least in part on the early indication signal, the amount of buffered signal data that can be included in a traffic frame with the packet of voice data received from the voice encoder;
   f) building, within the multiplexer, traffic frames that include voice data and signal data as determined in step (e); and
   g) outputting the traffic frames from the multiplexer to a coupled transmitter for transmission.

15. The method of claim 14 further including the steps of:

providing an early indication signal describing the size of the respective voice packets to a multiplexer coupled to the voice encoder; and configuring the traffic frame to accept a respective voice packet prior to receiving the voice packet in the multiplexer by using the early indication to reducing latency incurred in building the traffic frame.

16. The method of claim 14 wherein the signaling information includes control data for controlling communications with the CDMA communications station.

17. The method of claim 14 further including a channel codec coupled between the multiplexer and the transmitter for encoding the traffic frame onto a traffic channel in accordance with CDMA protocols.

18. The method of claim 14 wherein the multiplexer is configured to build traffic frames 20 ms in length.

19. The method of claim 18 wherein the early indication allows the multiplexer to build the signaling information into the traffic frame while reserving a proper amount of space in the traffic frame for the voice packets described by the early indication.

* * * * *